United States Patent
Gallou

(10) Patent No.: US 12,085,206 B2
(45) Date of Patent: Sep. 10, 2024

(54) QUICK CONNECTOR AND CONNECTION ASSEMBLY HAVING IMPROVED SEALING-RING LOCKING

(71) Applicant: NORMA Germany GmbH, Maintal (DE)

(72) Inventor: Cedric Gallou, Guichen (FR)

(73) Assignee: Norma Germany GmbH, Maintal (DE)

( * ) Notice: Subject to any disclaimer, the term of this patent is extended or adjusted under 35 U.S.C. 154(b) by 0 days.

(21) Appl. No.: 17/773,354

(22) PCT Filed: Oct. 30, 2020

(86) PCT No.: PCT/EP2020/080589
§ 371 (c)(1),
(2) Date: Apr. 29, 2022

(87) PCT Pub. No.: WO2021/084106
PCT Pub. Date: May 6, 2021

(65) Prior Publication Data
US 2024/0151336 A1   May 9, 2024

(30) Foreign Application Priority Data
Oct. 31, 2019   (DE) .................... 10 2019 129 542.4

(51) Int. Cl.
*F16L 37/091*   (2006.01)
(52) U.S. Cl.
CPC ......... *F16L 37/091* (2013.01); *F16L 2201/10* (2013.01)

(58) Field of Classification Search
CPC ... F16L 37/0841; F16L 37/0885; F16L 37/12; F16L 37/1205; F16L 37/1225;
(Continued)

(56) References Cited

U.S. PATENT DOCUMENTS 4,541,658 A * 9/1985 Bartholomew ..... F16L 37/0987
251/149.6
4,753,458 A    6/1988 Case et al.
(Continued)

FOREIGN PATENT DOCUMENTS

DE        60304248 T2    8/2006
DE    102009022098 A1   11/2009
(Continued)

OTHER PUBLICATIONS

Indian Office Action for Indian Application No. 202217022887 dated Aug. 26, 2022 (5 pages).
(Continued)

*Primary Examiner* — Aaron M Dunwoody
(74) *Attorney, Agent, or Firm* — REISING ETHINGTON, P.C.

(57) ABSTRACT

A quick connector includes a housing having a receiving chamber for receiving, in a fluid-tight manner, a connecting piece, the receiving chamber transitioning into a line portion for conveying a fluid. A sealing chamber, which surrounds at least parts of the circumference of the receiving chamber and has at least one sealing ring arranged in the sealing chamber. A closure unit for locking the at least one sealing ring in the sealing chamber. The closure unit includes a sleeve, which delimits at least parts of the sealing chamber and has at least one arm extending from the sleeve, which arm is designed to lock the closure unit on the housing.

11 Claims, 2 Drawing Sheets

(58) Field of Classification Search
CPC ..... F16L 37/142; F16L 37/144; F16L 37/148; F16L 37/15; F16L 37/098; F16L 37/096; F16L 37/0985; F16L 37/127; F16L 37/133

See application file for complete search history.

(56) References Cited

U.S. PATENT DOCUMENTS

| | | | |
|---|---|---|---|
| 6,517,120 | B1 | 2/2003 | Miyajima et al. |
| 7,527,303 | B2 | 5/2009 | Furuya |
| 8,113,548 | B2 | 2/2012 | Gunderson |
| 9,523,454 | B2 | 12/2016 | Schutte et al. |
| 11,199,281 | B2 | 12/2021 | Gauthier |
| 2014/0319820 | A1* | 10/2014 | Takimoto ............ F16L 37/0885 285/148.21 |
| 2017/0122471 | A1* | 5/2017 | Kim ..................... F02M 55/00 |

FOREIGN PATENT DOCUMENTS

| | | |
|---|---|---|
| DE | 102012013305 A1 | 1/2014 |
| JP | 2002013684 A | 1/2002 |
| JP | 2019132431 A | 8/2019 |
| KR | 20220053018 A | 4/2022 |
| RU | 2536412 C2 | 12/2014 |
| WO | WO2018157994 A1 | 9/2018 |

OTHER PUBLICATIONS

German Office Action for German Application No. 10 2019 129 542.4 dated Jul. 9, 2020 (5 pages).
International Search Report for International Application No. PCT/EP2020/080589 dated Jan. 27, 2021 (3 pages).
English Translation of International Search Report for International Application No. PCT/EP2020/080589 dated Jan. 27, 2021 (2 pages).
Canadian Examination Report for Canadian Application No. 3,151,876 dated Apr. 4, 2023 (4 pages).
International Preliminary Report on Patentability for International Application No. PCT/EP2020/080589 dated May 3, 2022 (7 pages).
English Translation of International Preliminary Report on Patentability for International Application No. PCT/EP2020/080589 dated May 3, 2022 (7 pages).
Russian Office Action for Russian Application No. 2022112937/05(026926) dated Nov. 22, 2022 (5 pages).
Russian Search Report for Russian Application No. 2022112937/05(026926) dated Nov. 22, 2022 (3 pages).
English Translation for Russian Office Action for Russian Application No. 2022112937/05(026926) dated Nov. 22, 2022 (4 pages).
English Translation of Russian Search Report for Russian Application No. 2022112937/05(026926) dated Nov. 22, 2022 (2 pages).
Japanese Office Action for Japanese Application No. 2022-522029 dated May 23, 2023 (8 pages).
English Translation of Japanese Office Action for Japanese Application No. 2022-522029 dated May 23, 2023 (11 pages).
Korean Office Action for Korean Application No. 10-2022-7010829 dated Apr. 1, 2024 (4 pages).
English Translation of Korean Office Action for Korean Application No. 10-2022-7010829 dated Apr. 1, 2024 (4 pages).
Chinese Office Action for Chinese Application No. 202080064969.9 dated Mar. 27, 2024 (7 pages).

* cited by examiner

QUICK CONNECTOR AND CONNECTION ASSEMBLY HAVING IMPROVED SEALING-RING LOCKING

INTRODUCTION

The disclosure relates generally to a quick connector and a connection assembly.

Quick connectors are frequently used for producing fluid-conveying connections. To this end, a hose or a first fluid channel may be arranged on one side on a quick connector. A second fluid channel may be connected to the quick connector by a connecting piece. The connecting piece may be inserted into a receiving chamber of the quick connector and positioned in a fixed manner.

So that no leakage occurs between the quick connector and the connecting piece, sealing rings which surround the receiving chamber on the circumferential side are used. The sealing rings are fastened by a sleeve inside the quick connector. The sleeve has a projection which may protrude into a circumferential groove in order to position the sleeve and thus also the sealing rings in a fixed manner.

Such fastening concepts of sealing rings, however, are problematic since to this end the sleeve and also the quick connector have to be designed to be flexible or resilient. In particular, materials which are resistant to high temperatures are often fragile. Thus such quick connectors are not able to be assembled from materials which are resistant to high temperatures since the quick connector or the sleeve may rupture when the sleeve is inserted into the circumferential groove.

Moreover, such quick connectors have a higher production cost due to the circumferential groove which is designed as an undercut. Moreover, it is problematic that when the sealing rings are replaced a removal of material may occur due to the sleeve and thereby a progressive misalignment of the sealing rings due to the sleeve. The progressive misalignment may lead to a reduction in the sealing action.

SUMMARY

It is an object of one embodiment, therefore, to provide a quick connector and a connection assembly which may be produced at reduced cost and which are suitable for the use of materials which are resistant to high temperatures.

The disclosure relates to a quick connector. The quick connector comprises a housing having a receiving chamber for receiving, in a fluid-tight manner, a connecting piece, said receiving chamber transitioning into a line portion for conveying a fluid. Moreover, the quick connector comprises a sealing chamber which radially surrounds at least parts of the receiving chamber and has at least one sealing ring arranged in the sealing chamber. A closure unit of the quick connector serves for locking the at least one sealing ring, wherein the closure unit comprises a sleeve, which delimits at least parts of the sealing chamber and has at least one arm extending from the sleeve, which arm is designed to lock the closure unit on the housing.

The multipart closure unit may provide a retaining function or supporting function for the sealing rings by means of the sleeve and a retaining function for the sleeve by means of the at least one arm. As a result, contrary to the hitherto used quick connector geometries, no undercuts are required for fastening retaining elements in the housing. Due to the tension-free fastening of the closure unit in the housing, brittle or fragile materials, which are required for high temperature applications and applications with low permeation, may be used for the housing and for the closure unit.

In this case, the at least one arm of the closure unit may be designed in a flexible manner relative to the sleeve of the closure unit. The sleeve may have a substantially tubular or cylindrical shape which corresponds, for example, to a shape of the receiving chamber and/or the sealing chamber. The at least one arm may interact by a positive connection or by a frictional connection with the housing and lock the entire closure unit in a fixed manner, in particular in an axial manner. Thus the at least one sealing ring which is arranged in the sealing chamber may be supported by the sleeve of the closure unit and retained in the intended position thereof.

The sleeve of the closure unit and the housing may consist of a material which is resistant to high temperatures and, in particular, may consist of a brittle or fragile material, since the sleeve is arranged by a positive connection and without tension in the sealing chamber of the housing. The at least one arm may have a slight resilience due to a greater extension in the axial direction, in spite of the brittle material properties, and thus may be used for positioning the sleeve in a latching manner in the housing.

The housing of the quick connector according to an embodiment may be produced in a particularly simple manner in terms of technology since no undercuts and complex geometries are required. Thus the production speed of the quick connector may be increased.

The dimensions of the sealing chamber may be maintained even in the case of repeated replacement of the sealing rings, since the sleeve of the closure unit may be inserted in an optimal manner and without friction in the housing. Moreover, mechanical damage to the housing may be avoided when the sealing rings are replaced.

The housing may be shaped such that in an inserted state the closure unit is oriented in an optimal manner. This may be permitted, for example, by recesses which are shaped so as to correspond to the arm of the closure unit. Thus the risk of incorrect mounting may be reduced. Moreover, an optimal axial installation position of the closure unit in the housing may also be ensured thereby.

According to one embodiment, at one end opposing the line portion, the sealing chamber transitions into a locking portion which radially protrudes over the sealing chamber and/or is axially delimited on the end side by a projection. Preferably, per an embodiment, the at least one arm of the closure unit protrudes into the locking portion and is radially spread apart by a locking sleeve. As a result, the at least one arm of the closure unit may protrude into the locking portion and may be hooked or latched by a positive connection on the projection. By this measure, the closure unit may be arranged in a fixed manner on the locking portion. In the locked state, the closure unit is connected by a positive connection to the housing and is not able to be inadvertently released from the housing of the quick connector.

In particular, in the case of arms which are designed in a flexible manner relative to the sleeve and which radially protrude over the sleeve, the arms may be used as latching elements for the locking portion which is designed as a latching groove. If the closure element and thus the sleeve are positioned correctly in the sealing chamber, the at least one arm slides into the locking portion and forms a positive connection.

According to an embodiment, an additional locking sleeve may be used. This locking sleeve may be inserted into the locking portion in the region of the at least one arm of the closure unit. By inserting the locking sleeve, the at least one arm is pressed or spread apart radially against the housing, whereby the closure unit may be secured particularly effectively against being inadvertently released.

The closure unit may be secured in a particularly simple manner in terms of technology when the locking sleeve is able to be inserted into the locking portion on the end side. In particular, as a result, the at least one arm of the closure unit may be pressed by the inserted locking sleeve against the housing in the region of the locking portion and positioned in a fixed manner.

According to a further embodiment, the closure unit has two arms which extend from the sleeve, wherein the arms are arranged opposingly on the circumferential side. The two arms, in particular at least two arms, may be axially pressed against the housing in order to position the closure unit in the housing in a fixed manner. The force for axially pressing the arms against the housing may be generated in this case by the resilient material properties of the arms themselves and/or by the locking sleeve inserted in the locking portion of the housing. An even force distribution on the two opposing arms may be implemented by the opposing arrangement of the arms of the closure unit. Alternatively, three or more arms may be used when producing the closure unit.

The closure unit and thus also the sleeve of the closure unit may be axially retained in a predefined position by the arms.

According to a further embodiment, the locking sleeve is deformable or movable transversely to a longitudinal direction or axial direction in order to release the receiving chamber for the connecting piece. Depending on the design of the locking sleeve, this locking sleeve may be movable or deformable transversely to the longitudinal direction of the housing which corresponds to a direction of flow through the housing. Thus the at least two arms may serve as guide bearings for the locking sleeve, which simultaneously lock the arms against a removal of the closure unit from the housing. Preferably, per an embodiment, the arms of the closure unit may be designed such that the locking sleeve is movable or deformable between two positions. In a first position, the locking sleeve may release the receiving chamber of the housing and in a second position the locking sleeve may block or constrict the receiving chamber in order to secure an inserted connecting piece.

The blocking and the release of the receiving chamber may be implemented in a particularly simple manner in terms of technology when the locking sleeve is arranged so as to be deformable or movable transversely to a longitudinal extension of the arms of the closure unit. The arms of the closure unit may interact with the locking sleeve on the end side, wherein the locking sleeve may protrude through a slot or a recess in the housing between the arms of the closure unit along the locking portion. The arms of the closure unit may have, for example, apertures or stops for guiding the locking sleeve in some regions.

According to a further embodiment, the at least one arm of the closure unit radially protrudes over the sleeve at least in some regions. As a result, the at least one arm extends beyond a radial extension or an external diameter of the sleeve. Thus the at least one arm may protrude into corresponding recesses in the locking portion and ensure unhindered access of the connecting piece to the receiving chamber. In particular, as a result, a connecting piece which is shaped in a stepped manner may be inserted into the housing, wherein the arms of the closure unit may serve as limitations for a maximum permitted insertion depth.

An efficient guidance of the locking sleeve in the housing may be implemented if the at least one arm of the closure unit encompasses the locking sleeve at least in some regions. A bearing and guidance of the locking sleeve may be provided by the cooperation of the arm with the housing, for example also by a plurality of arms of the closure unit, whereby the locking sleeve is guided in a particularly accurate manner.

Preferably, the locking sleeve may slide or be deformed at least in some regions along the housing and/or a portion of the at least one arm. Such a deformation may take place in a targeted one-dimensional manner due to the guidance and bearing.

The locking sleeve may be inserted into the housing only when the closure unit has been correctly inserted. If the closure unit is arranged unevenly or obliquely in the housing, for example, the locking sleeve may be arrested by at least one arm. Thus the arms of the closure unit may serve as an indicator of a correct fit of the closure unit in the housing or a correct mounting.

According to a further embodiment, the closure unit is positioned in a fixed manner in the housing by means of a circumferential bulge of the sleeve and/or by means of the at least one arm. In particular, the housing may have in the region of the sealing chamber and/or the locking portion a corresponding shape, the circumferential bulge of the sleeve and/or the shape of the arms of the closure unit being able to positively interact therewith. A predefined fit of the closure unit and thus also of the sealing rings in the housing may be ensured by such a cooperation of the closure unit with the housing. Wherein the closure unit may be taken out of the housing without any material being removed.

The arrangement of the closure unit, the locking sleeve and/or the connecting piece in the housing may be checked in a particularly simple manner when the housing in the region of the sealing chamber or in the region of the locking portion and/or the locking sleeve comprise at least one opening incorporated on the circumferential side.

For example, the at least one opening or a checking window in the locking portion may be incorporated in the housing in order to permit a view of the arms and the locking sleeve. In addition to checking the mounting, a dismantling of the closure unit may also be simplified by means of such an opening.

The disclosure further relates to a connection assembly. The connection assembly comprises a quick connector according to an embodiment and a connecting piece. The connecting piece is able to be inserted into a receiving chamber of the quick connector.

In an embodiment the connecting piece may be locked by a locking sleeve in the inserted state. As a result, a subsequent or inadvertent removal of the connecting piece from the quick connector may be prevented. By actuating the locking sleeve which, for example, releases a receiving cross section of the receiving chamber, the connecting piece may be detached from the quick connector.

BRIEF DESCRIPTION OF THE FIGURES

Further features, details and advantages of the invention emerge from the wording of the claims and from the following description of embodiments with reference to the drawings, in which:

DETAILED DESCRIPTION

Figure 1:
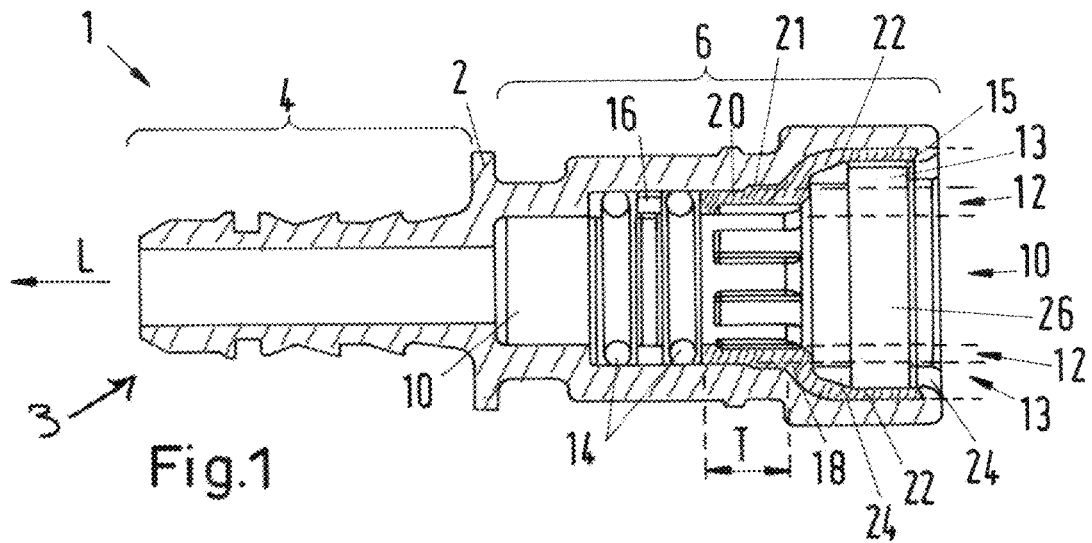
FIG. 1 shows a sectional view of a quick connector according to one embodiment.

In FIG. 1 a quick connector 1 according to one embodiment is shown in a perspective view. The quick connector 1 has a housing 2 and a claiming device 3. The housing 2 is produced from a metal or a metal alloy, such as for example stainless steel.

The clamping device 3 has a line portion 4 arranged at a spacing D in the circumferential direction.

FIG. 1 shows a sectional view of a quick connector 1 according to one embodiment. The quick connector 1 has a housing 2 which may be produced from a plastics, a ceramic or a metal.

The housing 2 is constructed in two parts and has a line portion 4 which transitions into a receiving portion 6. The line portion 4 serves for receiving pipes or hoses on the end side. The receiving portion 6 serves for receiving connecting pieces 8 in a fluid-tight manner (see FIG. 4).

According to the embodiment, the receiving portion 6 of the housing 2 has a receiving chamber 10. The receiving chamber 10 is cylindrically shaped and is configured centrally in the receiving portion 6. A sealing chamber 12 is incorporated in the housing 2 coaxially around the receiving chamber 10. The sealing chamber 12 surrounds the receiving chamber 10 in some regions.

The sealing chamber 12 and the receiving chamber 10 are widened in the longitudinal direction L on the end side by a locking portion 13 or locking chamber 13.

Two sealing rings 14 are arranged in the sealing chamber 12. The sealing rings 14 are designed according to the embodiment as O-rings and spaced apart from one another by a spacing ring 16 along a longitudinal axis L. The sealing rings 14 are arranged such that a connecting piece 8 inserted into the receiving chamber 10 is enclosed in a fluid-tight manner.

So that the sealing rings 14 and the spacing ring 16 remain in an intended position and orientation, a closure unit 18 is provided. The closure unit 18 consists of a sleeve 20. Two arms 22 extend from the sleeve 20 in the longitudinal direction L. The two arms 22 are arranged opposingly at a spacing of 180°. In particular, the two arms 22 protrude over an external diameter D of the sleeve 20.

In an inserted state the sleeve 20 of the closure unit 18 protrudes into the sealing chamber 12 and serves as a limitation for the sealing rings 14. For an optimal insertion depth T of the sleeve 20 in the longitudinal direction L, the sleeve 20 may have a bulge 21 which forms a positive connection with the housing 2. In the inserted state the sleeve 20 prevents the sealing rings 14 from sliding out of the sealing chamber 12 or slipping in the sealing chamber 12.

The sleeve 20 of the closure unit 18 is held in position or in the inserted state by the arms 22. To this end, the arms 22 may interact in a latching manner with the locking chamber 13.

So that the arms 22 of the closure unit 18 remain locked, an expansion sleeve 24 has been inserted on the end side into the housing 2. The expansion sleeve 24 spreads the arms 22 radially apart and presses the arms 22 against the housing 2. At least one projection 15 is arranged on the housing 2, said projection defining the locking chambers 13 on the end side and positively securing the spread-apart arms 22 against slippage.

The expansion sleeve 24 has an aperture in some regions in which a locking sleeve 26 is inserted into the housing transversely to the longitudinal direction L.

Figure 2:
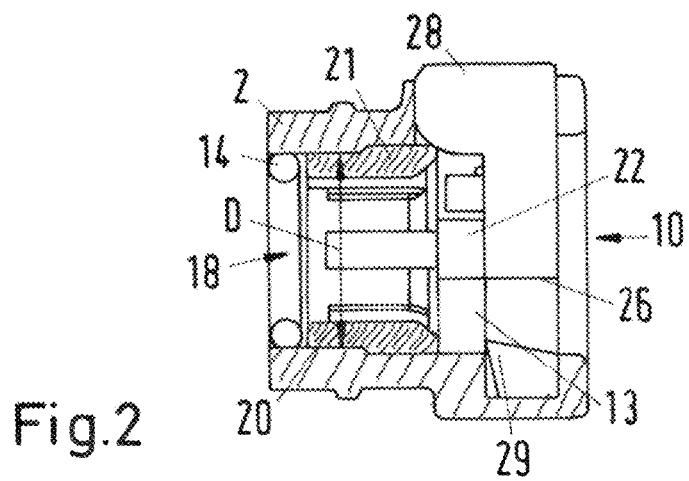
FIG. 2 shows a sectional view of a locking portion of the quick connector.

In FIG. 2 a sectional view of a locking portion 13 of the quick connector 1 is illustrated. The locking sleeve 26 is shown here from a different perspective. The locking sleeve 26 protrudes through the housing 2 and may be pushed into the housing 2 on an actuating portion 28.

By pushing in the locking sleeve 26, a locking pin 29 of the locking sleeve 26 is moved out of the receiving chamber 10 in order to release the receiving chamber 10 for receiving or removing the connecting piece 8.

If the actuating portion 28 is not pushed in, due to the resilient material properties of the locking sleeve 26 the locking pin 29 returns into its original blocking position.

The locking sleeve 26 may slide between the two arms 22 of the closure unit 18. Thus the arms 22 and/or the expansion sleeve 24 serve as guides for the locking sleeve 26.

Figure 3:
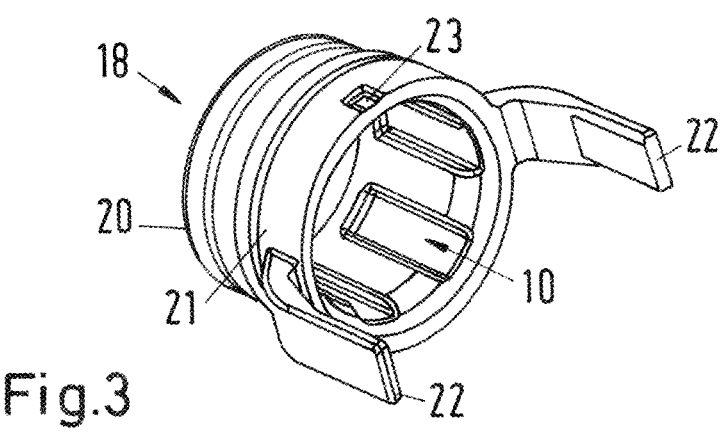
FIG. 3 shows a perspective view of a closure unit according to one embodiment.

FIG. 3 illustrates the closure unit 18 according to one embodiment in a perspective view. In this case, the shape of the closure unit 18 is shown in detail.

The sleeve 20 of the closure unit 18 forms a part of the receiving chamber 10 and may be arranged in the housing 2 in a fixed manner by means of the arms 22. Depending on the design, the closure unit 18 may also have one arm 22 or more than three arms 22. The arms 22 in this case may be distributed evenly or unevenly along a circumference of the sleeve 20.

So that the closure unit 18 is arranged in a rotationally fixed manner in the housing 2, it is possible to provide further depressions or recesses 23 which may form a positive connection with the housing. As a result, the orientation of the arms 22 relative to the locking sleeve 26 may be ensured.

Figure 4:
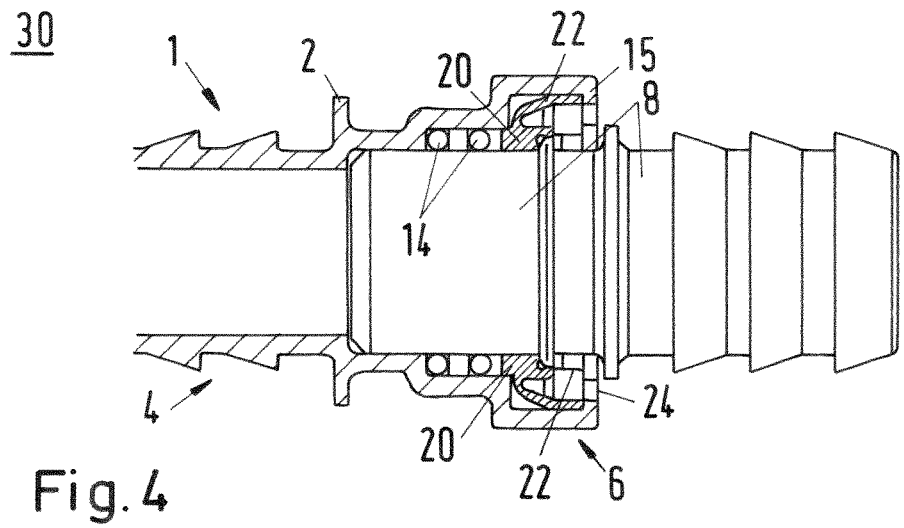
FIG. 4 shows a schematic sectional view of a connection assembly according to one embodiment.
Figure 5:
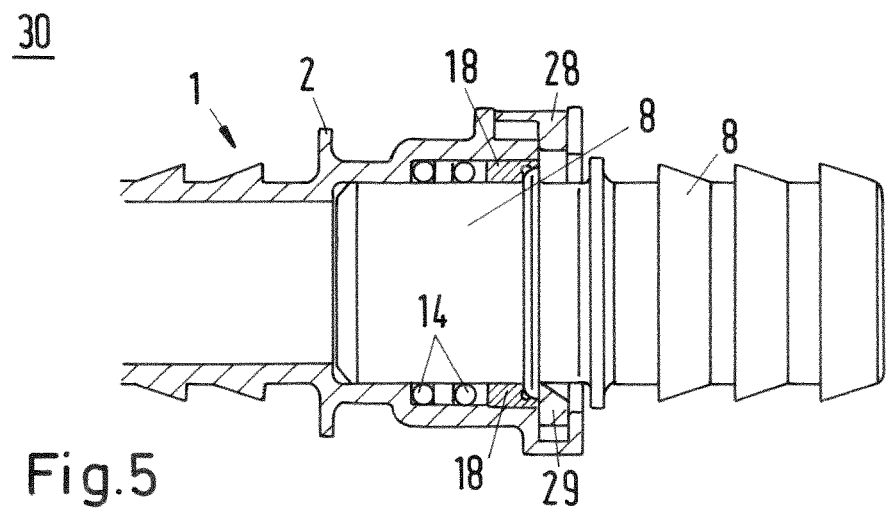
FIG. 5 shows a schematic sectional view of the connection assembly of FIG. 4

FIG. 4 and FIG. 5 show schematic sectional views of a connection assembly 30 according to one embodiment. The connection assembly 30 consists of a quick connector 1 and a connecting piece which may be inserted in the quick connector 1 in a fluid-tight manner.

The interactions of the components of the quick connector 1 and the inserted connecting piece 8 are illustrated here. The sealing rings 14 are pressed between the housing 2 and the connecting piece 8 in order to form a fluid seal. The sealing rings 14 are held in position by the sleeve 20 of the closure unit 18.

The locking sleeve 26 spreads the arms 22 of the closure unit 18 apart from one another against the housing 2 and ensures the correct positioning of the closure unit 18 in the housing. At the same time, the arms 22 of the closure unit 18 serve as sliding guides for the locking sleeve 26. Depending on the design of the quick connector 1, the expansion sleeve 24 may be dispensed with.

Moreover, the locking sleeve 26 together with the locking pin 29 serve as a securing device for the inserted connecting piece 8.

Figure 6:
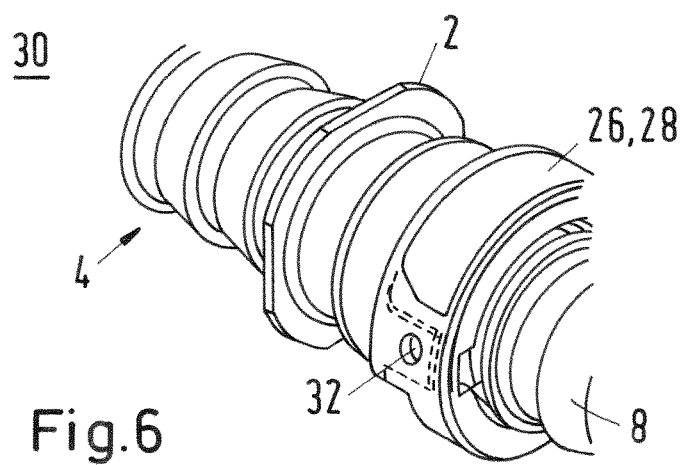
FIG. 6 shows a perspective view of a connection assembly.

In FIG. 6 a further perspective view of a connection assembly 30 according to a further embodiment is shown. In contrast to the already shown embodiments, an opening 32 is incorporated in the housing 2 of the quick connector 1.

The opening 32 is incorporated in the housing 2 on a portion of the housing 2 adjacent to the actuating portion 28 of the locking sleeve 26 and protrudes into the receiving chamber 10. The opening 32 may thus be used for checking a correct arrangement of the closure unit 18 and the connecting piece 8.

The invention is not limited to one of the above-described embodiments, but may be modified in many different ways.

All of the features and advantages, including structural details, spatial arrangements and method steps, revealed from the claims, the description and the drawing, may be essential to the invention both per se and in very different combinations.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

1 Quick connector
2 Housing
4 Line portion
6 Receiving portion
8 Connecting piece
10 Receiving chamber
12 Sealing chamber
13 Locking chamber/locking portion
14 Sealing ring
15 Projection of locking chamber
16 Spacing ring
18 Closure unit
20 Sleeve of closure unit
21 Bulge of sleeve
22 At least one arm of closure unit
23 Recess in sleeve
24 Expansion sleeve
26 Locking sleeve
28 Actuating portion
29 Locking pin
30 Connection assembly
32 Opening/viewing window
D External diameter of sleeve
Longitudinal axis L
T Insertion depth of sleeve

The invention claimed is:

1. A quick connector comprising: a housing having a receiving chamber for receiving, in a fluid-tight manner, a connecting piece, wherein the receiving chamber transitions into a line portion for conveying a fluid; comprising a sealing chamber which surrounds at least parts of the circumference of the receiving chamber and has at least one sealing ring arranged in the sealing chamber; and comprising a closure unit for locking the at least one sealing ring in the sealing chamber; wherein the closure unit comprises a sleeve, which delimits at least parts of the sealing chamber and has at least one arm extending from the sleeve, which arm is designed to lock the closure unit on the housing, wherein the closure unit is positioned in a fixed manner in the housing by means of a circumferential bulge of the sleeve and/or by means of the at least one arm.

2. The quick connector as claimed in claim 1, wherein at one end opposing the line portion, the sealing chamber transitions into a locking portion which radially protrudes over the sealing chamber and/or is axially delimited on the end side by a projection, wherein the at least one arm of the closure unit protrudes into the locking portion and is radially spread apart by a locking sleeve.

3. The quick connector as claimed in claim 2, wherein the locking sleeve is able to be inserted into the locking portion on the end side.

4. The quick connector as claimed in claim 2, wherein the locking sleeve is deformable or movable transversely to a longitudinal direction (L) in order to release the receiving chamber from the connecting piece.

5. The quick connector as claimed in claim 4, wherein the locking sleeve is arranged so as to be deformable or movable transversely to a longitudinal extension of the arms of the closure unit.

6. The quick connector as claimed in claim 2, wherein the at least one arm of the closure unit encompasses the locking sleeve at least in some regions.

7. The quick connector as claimed in claim 2, wherein the housing in a region of the sealing chamber or in a region of the locking portion and/or the locking sleeve comprise at least one opening incorporated on a circumferential side of the receiving chamber.

8. The quick connector as claimed in claim 1, wherein the closure unit has two arms which extend from the sleeve, wherein the arms are arranged opposingly on a circumferential side of the receiving chamber.

9. The quick connector as claimed in claim 1, wherein the at least one arm of the closure unit radially protrudes over the sleeve at least in some regions.

10. A connection assembly comprising the quick connector as claimed in claim 1 and comprising a connecting piece which is able to be inserted into the receiving chamber of the quick connector.

11. A quick connector comprising: a housing having a receiving chamber for receiving, in a fluid-tight manner, a connecting piece, wherein the receiving chamber transitions into a line portion for conveying a fluid; comprising a sealing chamber which surrounds at least parts of the circumference of the receiving chamber and has at least one sealing ring arranged in the sealing chamber; and comprising a closure unit for locking the at least one sealing ring in the sealing chamber; wherein the closure unit comprises a sleeve, which delimits at least parts of the sealing chamber and has at least one arm extending from the sleeve, which arm is designed to lock the closure unit on the housing, wherein at one end opposing the line portion, the sealing chamber transitions into a locking portion which radially protrudes over the sealing chamber and/or is axially delimited on the end side by a projection, wherein the at least one arm of the closure unit protrudes into the locking portion and is radially spread apart by a locking sleeve, and wherein the housing in a region of the sealing chamber or in a region of the locking portion and/or the locking sleeve comprise at least one opening incorporated on a circumferential side of the receiving chamber.

\* \* \* \* \*